United States Patent [19]

Brown

[11] Patent Number: 4,594,806
[45] Date of Patent: Jun. 17, 1986

[54] FISHING LURE WITH FINS PROVIDING A SIDE TO SIDE MOTION

[76] Inventor: John L. Brown, 12 Amundsen Bay, Winnipeg, Manitoba, Canada, R3K 0V2

[21] Appl. No.: 739,193

[22] Filed: May 30, 1985

[51] Int. Cl.[4] .............................................. A01K 85/04
[52] U.S. Cl. .................... 43/42.18; 43/42.5; 43/42.27; 43/42.44
[58] Field of Search ............... 43/42.18, 42.5, 42.27, 43/42.44

[56] References Cited

U.S. PATENT DOCUMENTS

| D. 176,106 | 11/1955 | Buck | 43/42.5 |
|---|---|---|---|
| 1,598,458 | 10/1926 | Crosby | 43/42.5 |
| 1,738,617 | 12/1929 | Scharrer | 43/42.5 |
| 1,963,380 | 6/1934 | Peters | 43/42.5 |
| 2,380,328 | 7/1945 | Pecher | 43/42.5 |
| 2,650,450 | 9/1953 | Grathwohl | 43/42.5 |

Primary Examiner—Nicholas P. Godici
Assistant Examiner—C. McKee
Attorney, Agent, or Firm—Adrian D. Battison

[57] ABSTRACT

A fishing lure shaped to provide a side to side movement which drawn through the water without spinning is formed from a flat metal blank having an elongate body portion defining a front end and a tail end with a pair of opposed fins extending outwardly from the sides. The front portion is turned downwardly and slightly spooned, the tail portion is turned downwardly so that the body portion as a whole is arched and the fins are turned upwardly at a shallow angle with trailing edges turned further upwardly.

9 Claims, 8 Drawing Figures

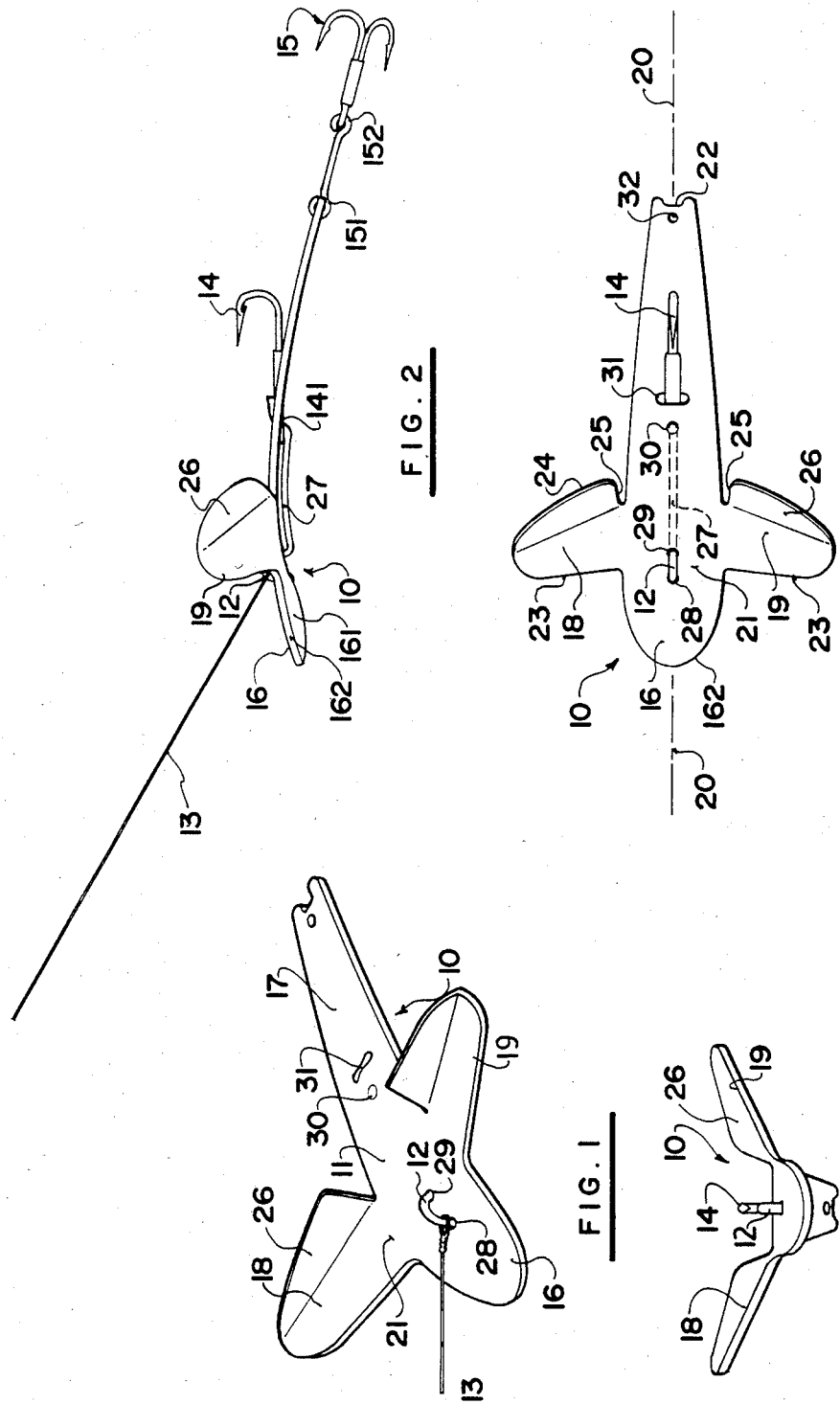

FISHING LURE WITH FINS PROVIDING A SIDE TO SIDE MOTION

BACKGROUND OF THE INVENTION

This invention relates to a fishing lure which is designed to have a unique motion in the water when pulled by a line through the water.

Fishing lures of a multitude of different designs and shapes have been provided over the years which have various different types of movement and appeal to the fish in various different ways.

SUMMARY OF THE INVENTION

The present invention is designed to provide an improved lure which can be manufactured simply and inexpensively from a flat blank which is shaped to provide a unique movement and particularly a side to side movement which avoiding spinning of the lure about a central axis.

According to the invention, therefore, there is provided a fishing lure comprising a lure body formed from substantially rigid material shaped so as to define an elongate body portion symmetrical about a longitudinal center line having a front end and a rear end and a pair of opposed rigid fins each integral with the body portion and extending outwardly from a respectively side of the body portion such that the front end projects forwardly therefrom and the rear end projects rearwardly therefrom, said body being bent such that said front end forwardly of said fins turns downwardly and such that each fin is bent upwardly about a line longitudinal of the body portion and has a trailing edge thereof bent upwardly about a line transverse to the body portion, eyelet means for attaching a line to said body, said eyelet being provided on said center line and intermediate said front end and said rear end, and fish hook means attached to said body whereby the lure when pulled by the line moves from side to side without spinning.

This unique shape provides a movement which is highly attractive to fish in which the lure swings from left to right by effectively diving left and then diving right so the center line moves back and forth while the lure also twists about an axis at right angles to the body at approximately at a mid point.

The eyelet is preferably attached at a line joining the front edges of the fins. The fins are preferably bent slightly forwardly relative to a transverse line.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is an isometric view of a lure according to the invention.

FIG. 2 is a side elevational view of the lure of FIG. 1 including hooks which are omitted from FIG. 1.

FIG. 3 is a front elevational view of the lure of FIGS. 1 and 2.

FIG. 4 is a plan view of the lure of FIG. 1.

In the drawings like characters of reference indicate corresponding parts in the different figures.

DETAILED DESCRIPTION

Figure 5:
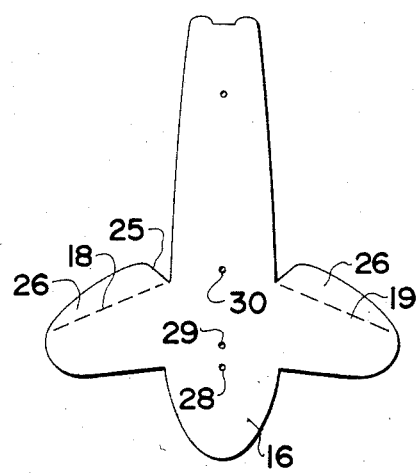
FIG. 5 is a plan view of a blank for forming a lure similar to FIG. 1 but modified therefrom.

Turning firstly to the embodiment shown in detail in FIGS. 1 through 4, a fishing lure generally indicated at 10 comprises a lure body 11, an eyelet 12 for attachment to a line 13 and one or more hooks, two of which are shown in FIG. 2 at 14 and 15. The lure body 11 is formed from a flat blank of sheet metal or other substantially rigid material which can be bent and retain the bent shape so as to form the structure shown in the drawings.

Specifically the lure body 11 includes a front nose portion 16, a rear tail portion 17 and a pair of opposed side fins 18 and 19. The whole body 11 is symmetrical about a center line 20. The front portion 16 is coupled to a central section 21 intermediate the fins 18 and 19 with the front portion 16, central section 21 and tail portion 17 integrally forming an elongate body which is rounded at the front portion and tapers gradually to a rear end 22 which is effectively cut sharply transverse to the body. The width of the central section 21 is approximately equal to the outward extent of the fins 18 and 19 and the front section 16 is approximately equal to the size of the fins 18 and 19. In the embodiment shown in particularly FIG. 4, the front section 16 is formed as half of an ellipse.

The fins 18 and 19 have a front edge 23 which is inclined at a shallow angle forwardly relative to a line at right angles to the axis 20 and have a trailing edge 24 which joins in a smooth curve to the front edge 23 and is directed inwardly and rearwardly. The innermost edge of the trailing edge 24 is connected to the main body 11 by a cut out section 25 which forms a trailing section 26 of the fin which is separate from the body 11.

The flat blank after cutting to the shape defined above is bent to the particular and unique shape as follows. Assuming the central section 21 remains substantially constant and in the original horizontal orientation, the front portion 16 is bent downwardly at a shallow angle effectively about a line joining the front edges 23 of the fins. In addition, the rear portion 17 is also bent downwardly with a curvature which commences rearwardly of the fins and gradually decreases so that the rear portion adjacent the end 22 is substantially flat but is turned down relative to the flat central section 21 through an angle of the order of 10 degrees. Thus, as shown in FIG. 2 the body portion forms an arch shape with both the front and rear portions turned downwardly from the central section 21.

In addition, the front portion 16 is formed into a slight spoon shape as shown best in FIG. 2 where a central area 161 of the front portion 16 is depressed relative to an outer edge 162 of the portion 16 to cup or spoon the area forwardly of the fins 18 and 19.

As shown best in FIG. 3, the fins 18 and 19 are bent upwardly at an angle of the order of 30 degrees at the edge of the body portion where the fin joins. Furthermore, the trailing portion 26 of each fin is turned further upwardly about a line longitudinal of each fin respectively.

The eyelet 12 is formed by a wire 27 which commences at an opening 28 in the front portion forming the loop or eyelet 12 before passing through a second opening 29 in the body. The wire then passes along the under side of the body as shown best in FIG. 2 and terminates at a further opening 30 in the tail portion. The wire can be attached to the body by flattened ends which cooperate with the openings 28 and 30 to attain the wire in position on the body. The eyelet 12 straddles a line joining the front edges of the fins so that the line 13 is effectively coupled on the line joining the front edges and applies forward and upward force to the lure body at that point.

The wire portion 27 underneath the body is used for attachment of the hook 14 which then passes through a slot 31 in the tail portion approximately midway therealong. The hook 14 has a loop 141 at its front end which passes over a vertical portion of the wire 27 at the opening 30 so that the hook 14 can move from side to side within the slot 31 but is prevented from twisting.

A further hook 15 is attached to the rear end of the tail portion through an opening 32 with the hook having a loop 151 which co-operates with the opening 32 to allow side to side movement of the hook. The hook is articulated at a further loop section 152 to allow the hook to twist and turn as necessary.

The method of mounting of the hook or hooks can be modified and in one arrangement a single hook is mounted on the wire 27 above the opening 30 in an effectively rigid manner so as to remain attached to the tail portion 17 without twisting or pivotal movement. In this arrangement the rear end 22 of the tail portion can be bent or folded about the center line 20 so as to clamp the hoop in place. Alternative methods of mounting the hooks are possible but it is important to avoid any possibility of the rearmost hook pivoting to a position where it interlocks with the forward hook since this eliminates the effectiveness of both hooks and interferes with the lure action.

In operation the lure is cast and then drawn through the water at a moderate speed with the line taking up an angle approximately that shown in FIG. 2. The shape of the lure makes it draw down in the water so that forward motion of the line causes the lure to dive and hold the line at an angle in the water beneath the surface. In addition, the fins and the shaping cause the lure to dive or twist left and right so that as one fin grabs the water the lure tends to move off the center line forwardly and sidewardly and at the same time twisting about a line at right angles to the body and at right angles to the center line. After one fin and the front portion have acted to draw the lure to one side, the lure tends to twist slightly so that the other fin and the front portion act to draw the lure back towards the other side and pass through the center line. The lure thus moves from side to side and also twists about the above-mentioned axis to provide a very attractive movement for predatory fish. At the same time the fins and the body shape prevent the lure from twisting or spinning about the line 13 which would otherwise cause tangling of the line and interference with the proper wriggling motion described above.

Turning now to FIGS. 5 through 8, it will be appreciated that the body shape in the form of the flat blank shown in each of the drawings has basically the same shape as that shown in FIGS. 1 through 4. However, the embodiment of FIG. 5 has been modified to broaden the body portion relative to the length and to increase the angle of the cut out section 25 which defines the trailing portion 26 of each of the fins 18 and 19.

Figure 6:
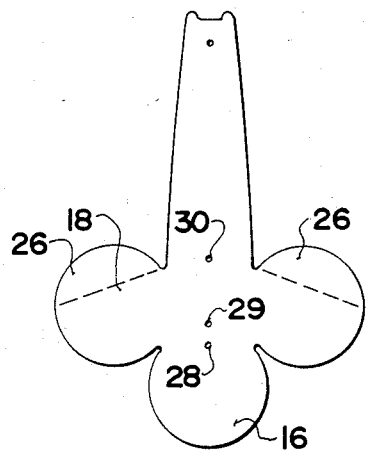
Figure 7:
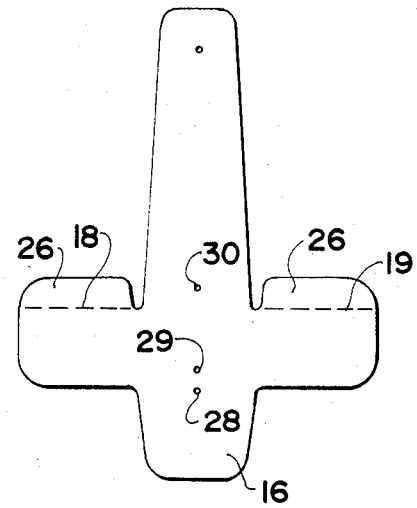

FIG. 6 shows a further example in which the front portion and the two fins are formed as circular sections. In FIG. 7 the front portion and fins are formed as substantially square sections with rounded corners.

In each of the above three embodiments the blank is bent in the manner described above that is the front portion 16 is bent downwardly and spooned and the fins 18, 19 are bent upwardly with a trailing edge portion 26 turned upwardly. The openings 28, 29 and 30 are provided in the blanks as previously described to mount the wire forming the eyelet and support for a hook. The positioning of the eyelet is as previously described substantially on the line joining the front edges of the fins 18 and 19.

Figure 8:
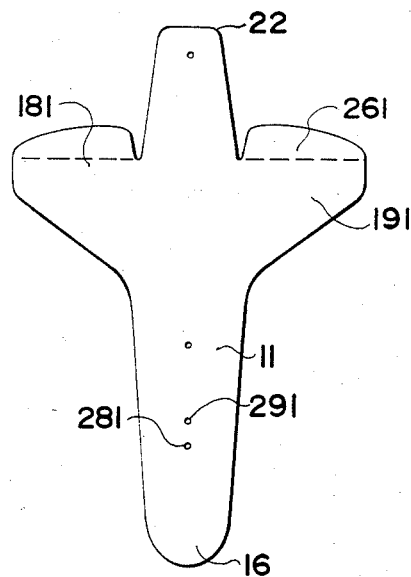
FIGS. 6, 7 and 8 show further blanks having the same basic characteristics as the lure of FIG. 1 but modified therefrom to include different shapes of fin and body portion.

FIG. 8 shows a further modified arrangement in which the fins are moved rearwardly relative to the body 11 as shown at 181 and 191 so that the fins are closer to the rear edge 22 than the front edge of the front portion 16. However, the shaping of the flat blank is as previously described, that is, the front portion 16 is bent downwardly and spooned slightly and the fins are turned upwardly with a trailing edge portion 261 turned yet further upwardly. In this case the eyelet is provided at the openings 281, 291 that is forwardly of the front edge of the fins. Also in this case the rear portion is turned upwardly through a slight angle to avoid spinning of the lure.

As an alternative, it is possible to manufacture the lure by casting from a plastic material into the shape defined above, as opposed to the two step process of bending from a cut blank.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A fishing lure comprising a single piece lure body formed from substantially rigid material shaped so as to define an elongate body portion symmetrical about a longitudinal center line having a front end and a rear end and a pair of opposed rigid fins each integral with the body portion and extending outwardly from respective sides of the body portion such that the front end projects forwardly therefrom and the rear end projects rearwardly therefrom, said body being bent such that said front end forwardly of said fins turns downwardly and such that each fin is bent upwardly about a line longitudinal of the body portion and has a trailing edge thereof bent upwardly about a line longitudinal of each fin respectively, eyelet means for attaching a line to said body, said eyelet being provided on said center line and intermediate said front end and said rear end, and fish hook means attached to said body whereby the lure when pulled by the line moves from side to side without spinning.

2. The invention according to claim 1 wherein in each of the fins is of substantially the same surface area as the front end forward of the fins.

3. The invention according to claim 1 wherein the fins are swept forward slightly relative to a line at right angles to said center line.

4. The invention according to claim 1 wherein the fins have a maximum dimension in a direction transverse to said center line substantially equal to the dimension in the same direction of said body portion.

5. The invention according to claim 1 wherein said eyelet is arranged substantially on a line joining front edges of said fins.

6. The invention according to claim 1 wherein said front end has a slight spoon shape.

7. The invention according to claim 1 wherein the rear end rearwardly of said fins is longer than the front end forwardly of the fins.

8. The invention according to claim 1 wherein the body portion intermediate said fins is substantially flat from which each of said front and rear ends turns downwardly.

9. The invention according to claim 7 wherein the rear end rearwardly of the fins is turned downwardly so that the body portion is arched.

* * * * *